United States Patent [19]

Friese et al.

[11] Patent Number: 4,793,099
[45] Date of Patent: Dec. 27, 1988

[54] TAPE DRIVEN POWER WINDOW MODULE

[75] Inventors: Donald E. Friese, Northridge; Gerald P. Wirkkala, Downey, both of Calif.

[73] Assignee: NORAN, Los Angeles, Calif.

[21] Appl. No.: 100,126

[22] Filed: Sep. 23, 1987

[51] Int. Cl.⁴ .............................................. E06B 1/00
[52] U.S. Cl. ...................................... 49/380; 49/352; 49/362; 49/374; 296/146
[58] Field of Search ............... 49/380, 352, 374, 378, 49/362, 361, 445, 502

[56] References Cited

U.S. PATENT DOCUMENTS

| 3,014,716 | 12/1961 | Hitzelberger | 49/352 X |
| 3,566,540 | 3/1971 | Hewitt | 49/374 X |
| 4,004,371 | 1/1977 | Podolan et al. | 49/352 |
| 4,168,595 | 9/1979 | Pickles et al. | 49/352 |
| 4,237,657 | 12/1980 | Kazewych | 49/352 |
| 4,253,277 | 3/1981 | Campbell et al. | 49/352 |
| 4,364,202 | 12/1982 | Zavatkay | 49/352 |
| 4,400,913 | 8/1983 | Krantz et al. | 49/352 |
| 4,483,100 | 11/1984 | Blankenburg et al. | 49/374 X |
| 4,671,013 | 6/1987 | Friese et al. | 49/380 |

Primary Examiner—Philip C. Kannan
Attorney, Agent, or Firm—Spensley Horn Jubas & Lubitz

[57] ABSTRACT

A pair of slotted tapes made of a flexible material are slidingly disposed in opposed sides of a window frame to support corresponding side portions of a window pane. The tapes are driven downwardly or upwardly in unison along the opposed sides of the frame to open and close the window.

8 Claims, 6 Drawing Sheets

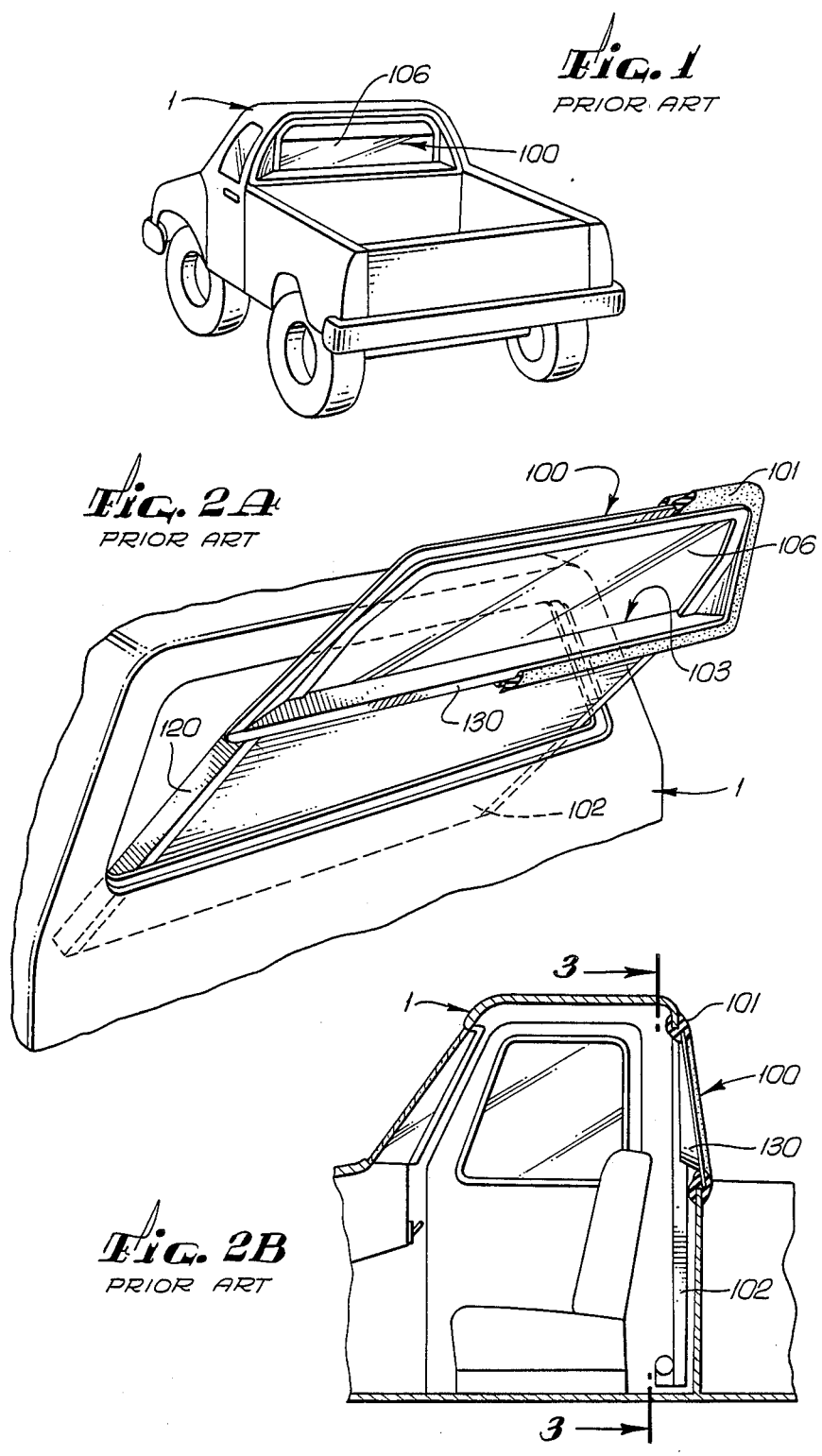

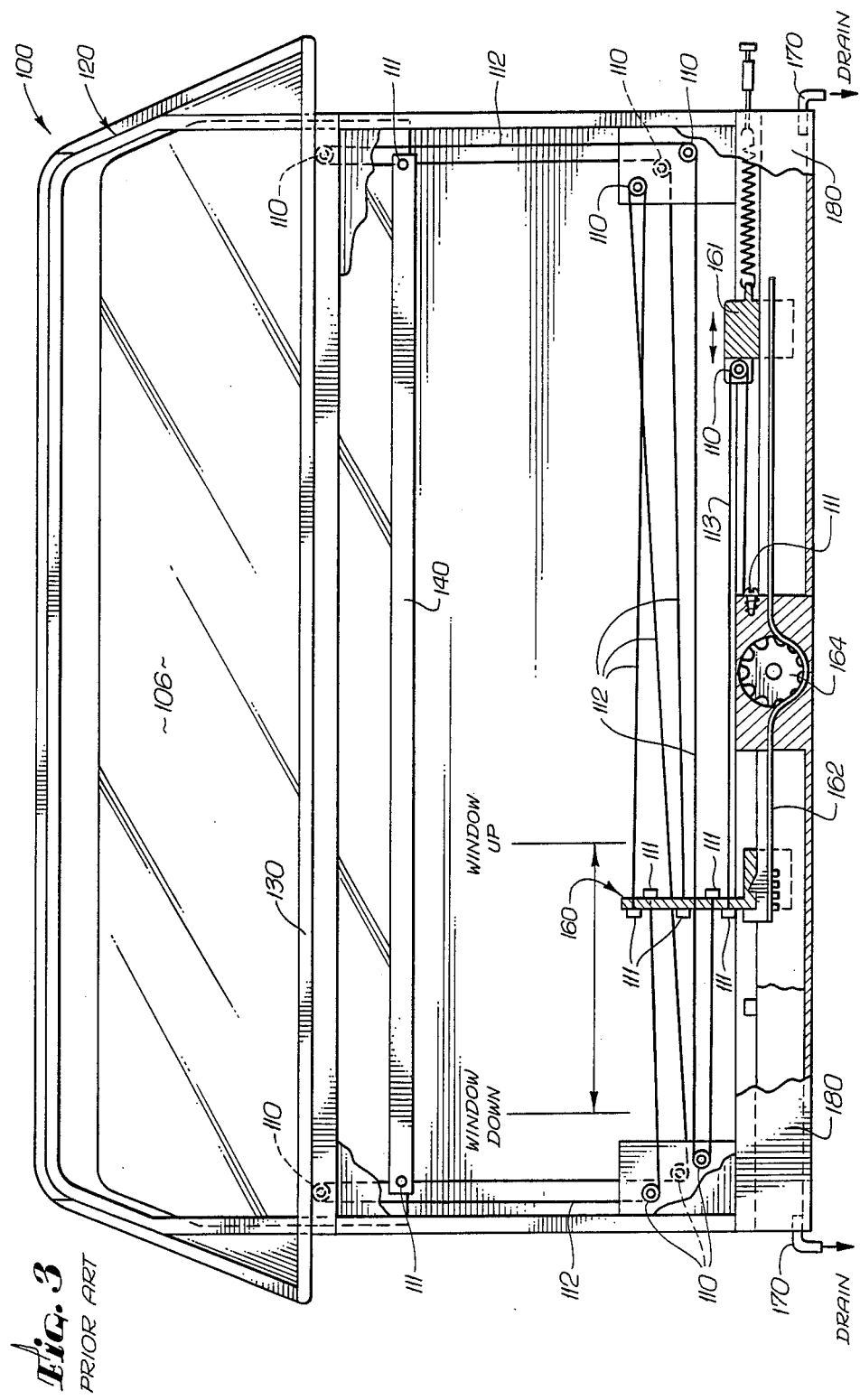

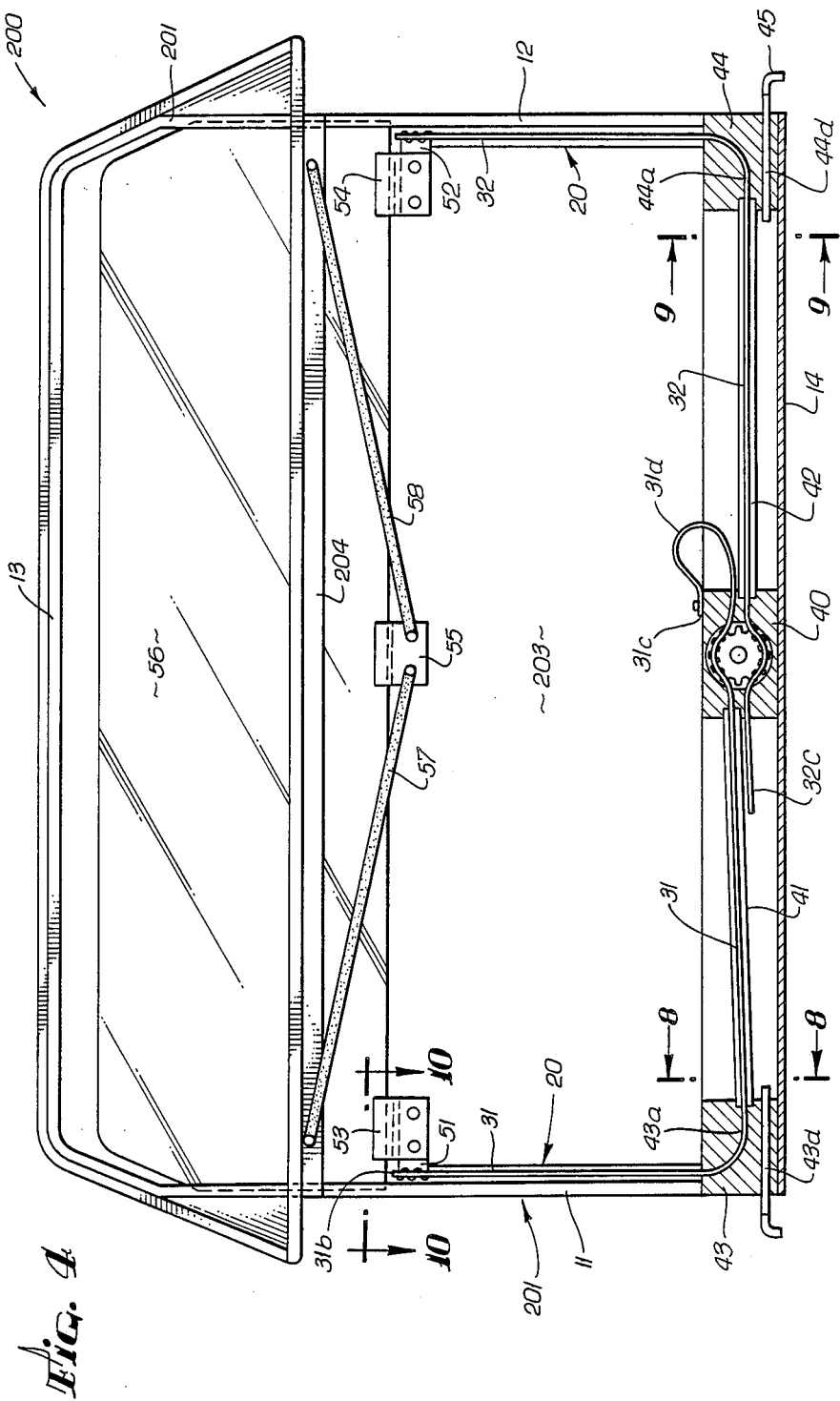

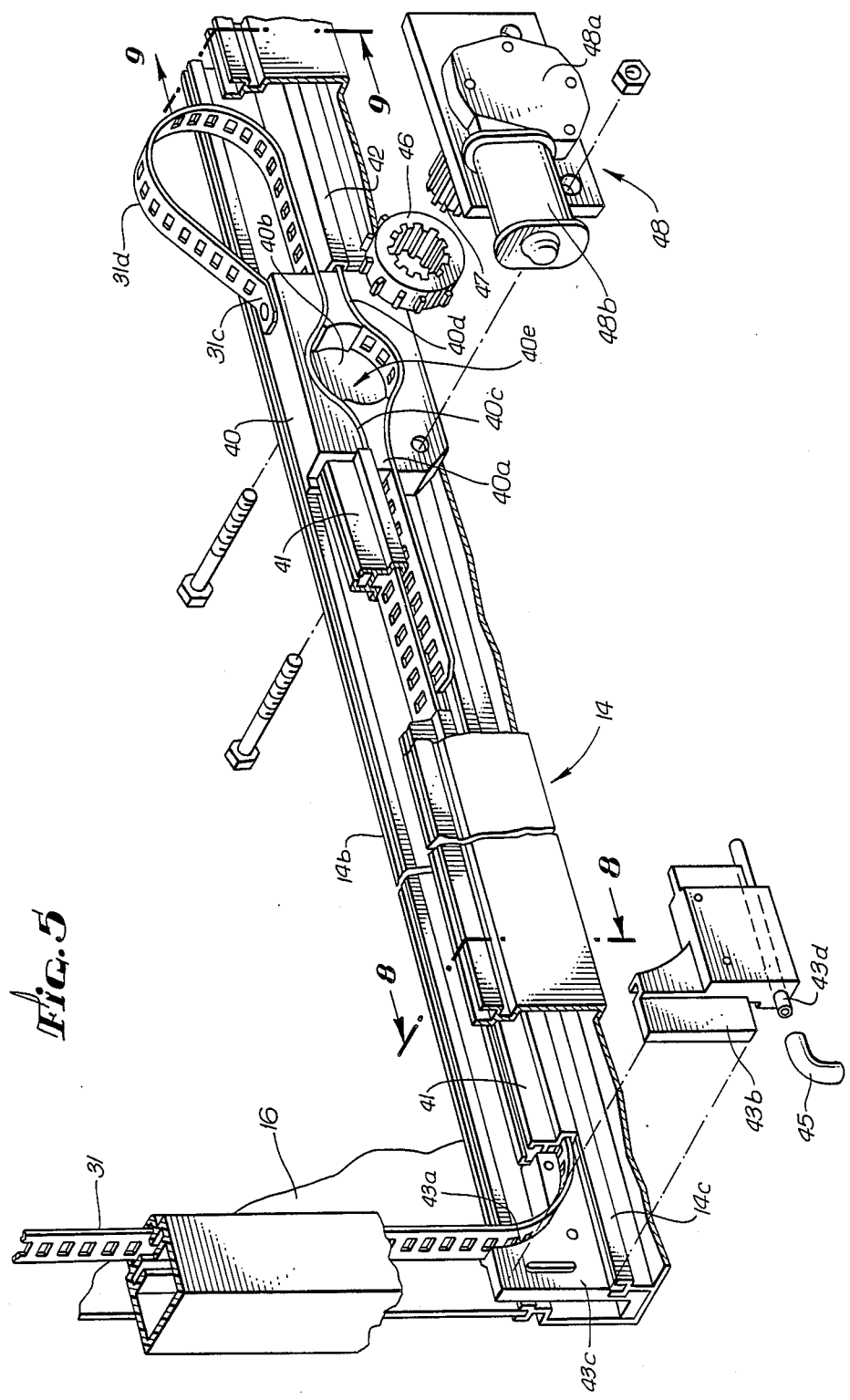

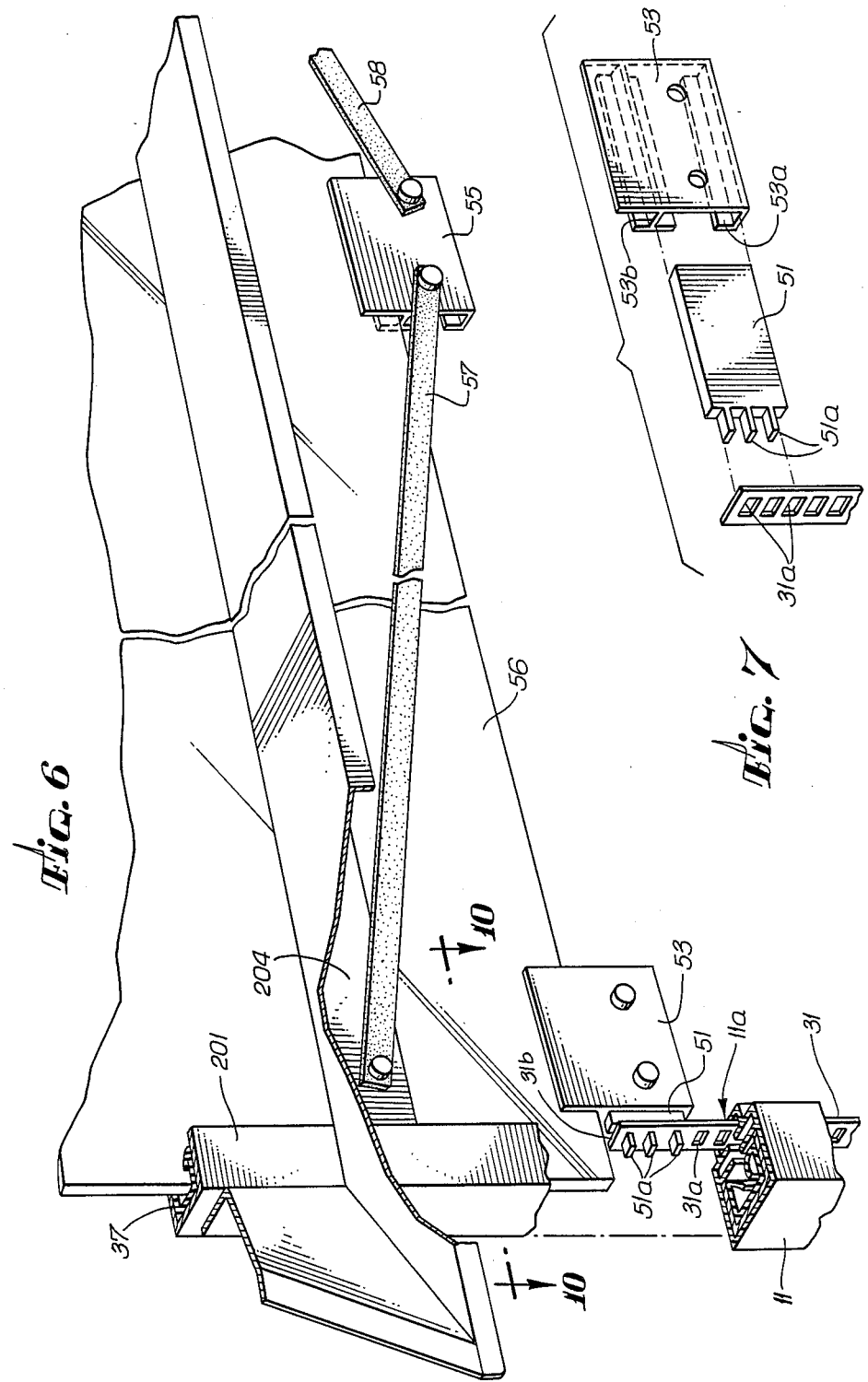

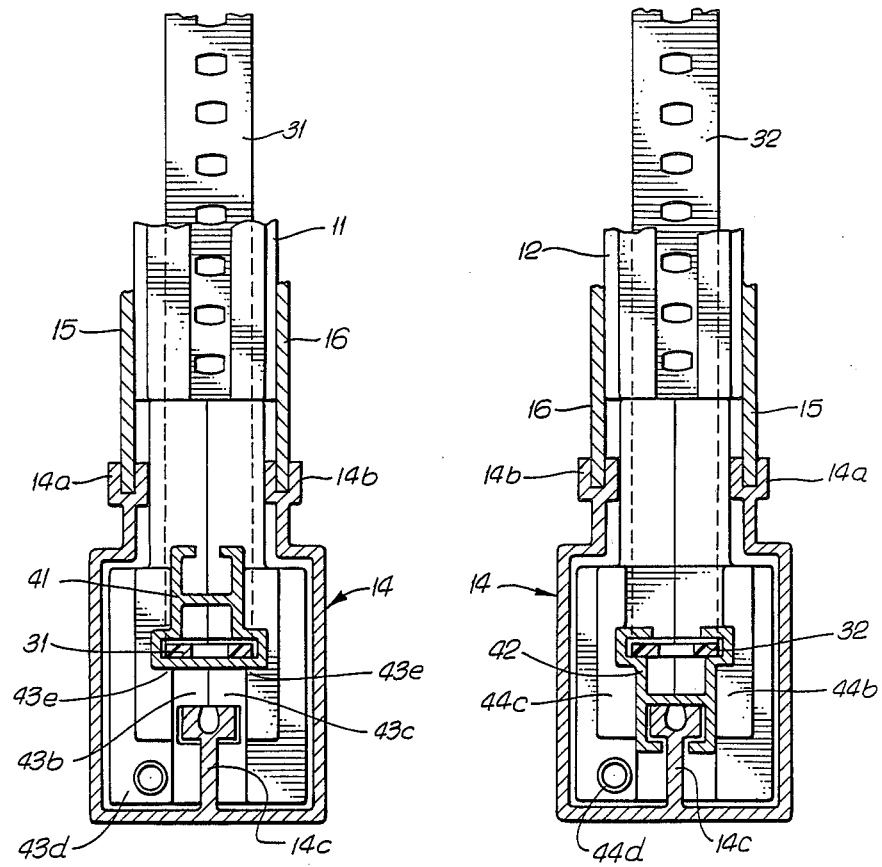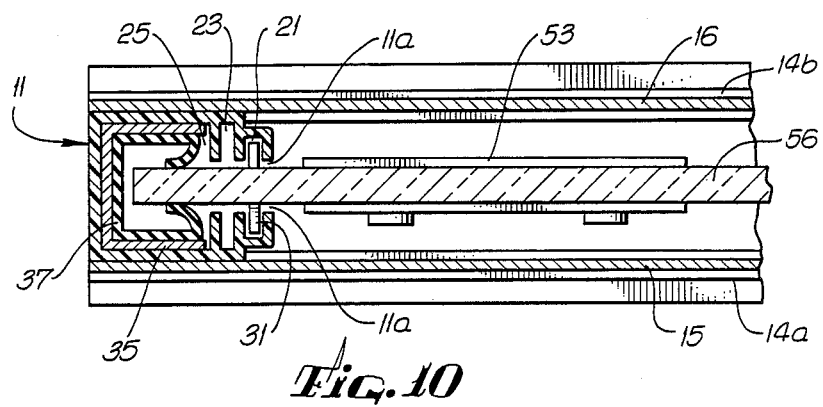

TAPE DRIVEN POWER WINDOW MODULE

BACKGROUND OF THE INVENTION

1. Field of the Invention

The present invention relates generally to power window modules and more specifically to window replacement assemblies for use in a rear cab opening of a truck.

2. Description of the Prior Art

In standard truck cabs which are mass produced by various manufacturers, a trapezoidal opening is provided at the rear of the cab for supporting a fixed glass window. Consumers have found it desirable to be able to open the rear window of the cab either partially or entirely in order to improve ventilation in the cab.

FIGS. 1–3 show a previously known power window module 100 which is disclosed in U.S. patent application Ser. No. 790,034 of Friese et al. The module 100 may be installed from the exterior of a truck cab 1 by sliding the module into a rear window opening 2 of the cab as shown in FIG. 2A so that it comes to rest inside the cab 1 as shown in FIG. 2B. A rubber gasket 101 is provided surrounding a trapezoidally-shaped, flanged upper portion 130 of the module to sealingingly engage the module with the borders of the rear window opening 2. The module 100 includes a glass window pane 106 which reciprocates vertically into and out of a window receiving well 103 provided in a lower portion 102 of the module. The module has a substantially rectangular metal frame 120 defining the shape of its peripheral portions.

FIG. 3 is a partial sectional view of the interior of the window module 100 taken along the line 3—3 of FIG. 2B. A series of pulleys 110 and pulley wires 112 are used to connect a horizontally reciprocating block 160 at the bottom of the receiving well 103 to a vertically reciprocating support bracket 140 at the bottom edge of the window pane 106. An additional pulley wire 113 couples the horizontally reciprocating block 160 to a spring loaded tensing block 161. A slotted tape 162, driven by a geared motor 164, pulls the reciprocating block 160 in opposition to the tensing block 161 between a window-up position and a window-down position as shown, to raise and lower the window pane 106. A pair of drain pipes 170 are inserted into the window receiving well 103 through a metal bottom frame portion 180 of the module 100 to remove any water which may collect at the bottom of the receiving well 103.

Several problems have been associated with the structure of FIG. 3. Its manufacturing cost is relatively large because of the time consuming process of stringing the various pulley wires 112, 113 around their associated pulleys 110 and of tying them to various tie points 111 within the system. Before or after the module 100 is installed in a truck cab 1, the pulley wires 112, 113 present a problem because they can come loose of the pulleys 110 (as a result of excessive shaking of the truck cab) to thereby render the module inoperable. Another problem associated with excessive shaking of the cab is that the drain pipes 170 can be shaken loose of their fittings in the bottom frame portion 180 of the module 100. Water can then collect at the bottom of the receiving well 103 and damage the unit. Each of the multiple pulleys 110 of the module 100 adds to the cost of manufacture of the module. Each pulley also increases the danger of the system becoming rotationally frozen by accumulated dirt. The aggragation of probabilities associated for example with pulley lock-ups, wire dislocations and drain pipe looseningings reduces the reliability of the window module 100. A simplified arrangement is needed.

SUMMARY OF THE INVENTION

It is an object of the present invention to overcome the above described problems.

The objective is met in accordance with a preferred embodiment of the present invention by providing a substantially rectangular frame and disposing a generally U-shaped guide means along the left, bottom and right interior sides of the frame. The U-shaped guide means is adapted to slidingly guide a pair of complementary slotted tapes, which are made of a flexible material having a predetermined compression and/or tensile strength, vertically along the upright left and right leg portions of its U-shape and laterally along the bottom of the U. A drive box is disposed at the bottom portion of the U-shaped guide means for driving the complementary tapes either upwardly in unison or downwardly in unison along the left and right leg portions of the U. The curvature of the U facilitates the bending of the tapes as they slide from a lateral orientation at the bottom of the U to a vertical orientation in the upright leg portions.

The drive box at the middle of the U is provided with a hollow portion through which the tapes pass. The slots of the slotted tapes are exposed in the hollow portion to be engaged by the teeth of a motor driven gear. The motor driven gear is interposed between the two slotted tapes so as to move the slotted tapes by substantially identical distances either upwardly or downwardly along the upright legs of the U-shaped guide means.

A window pane supporting bracket, adapted to support a window pane, is connected to the slotted tapes so that when the slotted tapes are driven by the motor driven gear, the window pane will move either upwardly or move downwardly within the frame as the tapes are driven vertically along the left and right leg portions of the U-shaped guide means.

BRIEF DESCRIPTION OF THE DRAWINGS

FIG. 1 shows a pick up truck incorporating a previously known power window module.

FIGS. 2A and 2B are respectively a rear perspective view and a side sectional view showing how the module of FIG. 1 is inserted into a rear opening of the truck cab.

FIG. 3 is a sectional view of the interior portion of the module shown in FIG. 1.

FIG. 4 is a sectional view of the interior of a power window module in accordance with the present invention.

FIG. 5 is a exploded view of a bottom portion of the module shown in FIG. 4.

FIG. 6 is a sectional view of a top portion of the module shown in FIG. 4.

FIG. 7 an exploded view of a coupling mechanism shown in FIG. 6.

FIG. 8 is a sectional view taken along the line 8—8 in FIG. 4.

FIG. 9 is a sectional view taken along the line 9—9 in FIG. 4

FIG. 10 a sectional view taken along the line 10—10 in FIG. 4.

Like reference numbers denote like elements in the various drawings.

DETAILED DESCRIPTION OF THE PREFERRED EMBODIMENT

The following disclosure describes the best mode presently contemplated for practicing the present invention. This description is not to be taken in a limiting sense. It is to be understood that the invention is better defined by the claims appended hereto.

Referring to FIG. 4, a sectional view of the interior of a power window module 200 in accordance with the present invention is shown. The module 200 has a substantially flat, rectangular shape which is defined by a peripheral fame 201. The peripheral frame 201 is constructed of left and right vertical legs, 11 and 12, which are integrally joined with a horizontal top bar 13. The left, right and top portions of the peripheral frame, 11-13, are mounted onto a horizontal base 14 of the frame. At the interior facing sides of the left, bottom, and right portions of the frame 201 there is provided a guide means, generally indicated at 20, for slidably guiding a movable pair of complementary slotted tapes, 31 and 32. As will be shortly described, the guide means 20 is preferably formed of a plurality of channels (conduits) having T-shaped cross sections that are positioned within the left and right vertical legs, 11 and 12, and the base 14 of the frame 201, with the vertical part of the T-shape directed toward the interior of the frame so as to receive the edges of a reciprocating window pane 56.

The complementary tapes 31, 32 are made of a flexible material. Organic plastics such as synthetic polyamides (nylons) polyurethanes (teflon) and the like may be used. Dymetrol, which is the trademark name of a plastic manufactured by DuPont having a slight amount of compressive resiliency and an acceptable coefficient of sliding friction, has been found to be a material well suited for forming the tapes 31, 32. Preferably, the vertical left and right conduits of the guide means 20 are adapted to press against opposed sides of the tapes so as to keep upright portions of the tapes substantially straight and thereby enhance the compression strength of the tapes.

A first of the tapes 31, which is referred to hereafter as the left tape, passes through a drive box 40, disposed centrally within the base 14, and is guided by a left channel piece 41 into a left corner piece 43, which is disposed at a left end of the base 14. The left corner piece 43 has an arc-shaped channel 43a which guides the left tape 31 into a left vertical channel 21 integrally formed in the left vertical leg 11 of the frame.

The other tape, which is referred to hereafter as the right tape 32, also passes through the drive box 40 and is guided by a right channel piece 42 along the bottom of the base to a right corner piece 44. The right corner piece 44 has an arc-shaped channel 44a which guides the right tape 32 into a right vertical channel 22 integrally formed in the right vertical leg 12 of the frame.

Referring briefly to FIG. 10, which is a sectional view of FIG. 4 taken along the line 10—10, it will be observed that the left vertical leg 11 is formed to have a plurality of chambers, 21, 23 and 25 (the chamber 21 forming the left vertical channel), each of which can be accessed from the interior of the frame through a vertical slit 11a provided at the interior side of the left vertical leg 11.

Referring to FIG. 6, wherein a sectionally exposed portion of the left vertical leg 11 is shown in perspective, it will be seen that a left coupler 51 having projecting fingers 51a is inserted into the vertical slit 11a from the interior of the frame such that its projecting fingers 51a engage with a plurality of regularly spaced slot holes 31a provided in the left tape 31. As best seen in FIG. 4, the left coupler 51 engages with an upper end 31b of the left tape. A lower end 31c the left tape is fastened to the drive box 40 so as to create an upwardly projecting tape loop 31d that expands into a window pane receiving well portion 203 of the module 200 as the window pane 56 is lowered.

In the exploded view of FIG. 7, it can be seen that the left coupler 51 is slidably inserted into a left window bracket 53 which has a first channel 53a for receiving the coupler 51 and also a second channel 53b formed at an upper portion thereof for engaging and supporting the bottom edge of the window pane 56.

In FIG. 6, it can be seen that a middle bracket 55 which is identical to the left bracket 53 is disposed to support a central portion of the window pane bottom. A pair of resilient bands, 57 and 58, extend pivotally from the middle bracket 55 to an exterior cross bracket 204 which is horizontally disposed at an upper portion of the frame. The resilient bands, 57 and 58, urge the window pane 56 upwardly to oppose the force of gravity. Their function will be explained in more detail shortly.

It will be apparent that the right side of FIG. 4, which shows a right coupler 52 and right window bracket 54 connecting a right portion of the window pane 56 to the right tape 32, is generally arranged in mirror image relation to the left side and it need not be explained in further detail.

FIG. 5 is an exploded perspective view showing the assembly of the left and bottom portions of the frame. The base 14, whose cross section taken along the lines 8—8 and 9—9 is best seen in FIGS. 8 and 9, is integrally provided with front and back panel grooves, 14a and 14b, for supporting respective front and back panels, 15 and 16 of the module 200. The front and back panels are preferably made of a light weight material such as plywood, aluminum or a light weight organic plastic of suitable rigidity. A central supporting groove 14c is also integrally defined within the base 14 for alignably retaining the drive box 40, left and right channel pieces, 41 and 42, and the left and right corner pieces, 43 and 44.

The left and right corner pieces are formed of respective split halves 43b, 43c and 44b, 44c. The split halves are adapted to close about the central supporting groove 14c of the base. Complementary ones, 43b and 44b, of the split halves are each provided with an integrally formed metal drainage tube, 43d and 44d, preferably caulked into its respective split half, for draining away collected water at respective front and back sides of the central supporting groove 14c. A downwardly curved drain hose 45 may be attached to each of the drainage tubes, 43d and 44d, to guide collected water in a downward direction away from the module 200. The drainage tubes, 43d and 44d, can also be molded into their respective corner pieces, 43 and 44, so as to assure a tight fit. The corner pieces are preferably made of hard urethane plastic.

The channel pieces, 41 and 42, are provided with identical, generally T-shaped cross sections (FIGS. 8 and 9). The left channel piece 41 is inserted into the base 14 with its T-shaped cross section inverted. The channel piece 42 is noninverted and engages with the central supporting groove 14c. A pair of lips 43e (FIG. 8) are provided in the left corner piece 43 to space the left channel piece 41 away from the central supporting groove 14c. The spacing leaves room for the bottom end 32c of the right tape 32 to pass between the left channel piece 41 and the central supporting groove 14c.

The drive box 40 is formed of a moldable material such as a hard polyurethane. Another lip 40a is provided on the drive box 40 for supporting the left channel piece 41 above the central groove 14c. A plurality of guide members are integrally formed projecting from a back plane 40b of the drive box to define an upper and lower tape passage, 40c and 40d, each of which includes a partially exposed arc segment that is adapted to guide the slotted tapes, 31 and 32, into engagement with the teeth of a motor driven gear 46. The gear 46 is preferably made of a durable plastic such as Rynite. A hollow portion 40e is provided in the drive box 40 for receiving the motor driven gear 46 and a drive shaft 47 projecting from a motor drive 48. The motor drive 48 comprises a high torque gear section 48a and a small reversible electric motor 48b.

When the electric motor 48b is energized to drive the gear 46 in either a clockwise or counterclockwise direction, the tapes 31 and 32 are driven through their respective passages, 40c and 40d, by substantially identical distances so that the tapes 31 and 32 will transmit almost identical forces to the left and right portions of the window pane 56. The window pane 56 is thereby urged to move vertically. As mentioned earlier, the tapes 31 and 32 are preferably made of a slightly resilient material. If the electric motor 48 starts or stops abruptly, the resiliency of the tapes acts to dampen the sudden force change created by the motor 48b so that the up or down motion of the window pane 56 will appear to be generally smooth.

Normally, the window pane 56 is made of a relatively heavy material such as glass. The window pane 56 will be urged to move downwardly at a substantially faster rate than its upward velocity due to its relatively large weight. The resilient bands, 57 and 58, are provided to counter the effects of the weight of the window pane 56. The resilient bands 57 and 58, which are made of a rubber-like material such as neoprene, act to reduce the rate at which the window pane 56 is lowered and to increase the rate at which the window pane is raised so that the lowering and raising operations will appear to occur at a substantially uniform velocity. When the window pane 56 is lowered into the receiving well 203, the upwardly projecting tape loop 31d extending from the lower end 31c of the left tape begins to accumulate in a relatively orderly manner within the receiving well 203 from an opposed direction.

FIG. 10 is a cross sectional view taken along the line 10—10 of FIGS. 4 and 6. As best seen in FIG. 10, the window pane 56 extends through the vertical slit 11a of the left vertical leg to project into a gasket chamber 25. A metal bracket 35 having spring-like characteristics is provided within the gasket chamber 25 to urge a gasket 37 against opposed sides of the window pane 56. The gasket 37 is made to include a rubbery material such as neoprene and is provided to seal space around the peripheral edges of the window pane 56 against moisture and wind.

The left and right vertical legs, 11 and 12, are preferably extruded plastic pieces made of for example a high impact No. 7020 plastic. Plastic is used preferably throughout the module 200 to reduce its weight. The drive box 40 and the corner pieces 43 and 44 are preferably made of a wear resistance hard urethane plastic. The base 14 and the channel pieces 41 and 42 are preferably formed out of extruded aluminum pieces.

Other materials and designs for practicing the present invention will, of course, become apparent to those skilled in the art, some being apparent only after study and others being merely matters of routine design choice. For example, the tape driven window of the present invention is not limited to use in pickup trucks. It can also be used in multicompartment vehicles such as limousines to selectively partition the passenger area from the driver's section. As such, the scope of the invention should not be limited by the particular embodiment described above but should be defined primarily by the appended claims and equivalents thereof.

We claim:

1. A window comprising:
    a window frame having a left vertical leg and a right vertical leg disposed at respective left and right exterior sides of the frame, the vertical legs each having a vertical conduit formed at an interior portion thereof and a vertical slit communicating between the vertical conduit and the interior of the window frame;
    a window pane, slidably disposed within the frame, the window pane having left and right edges respectively projecting into the vertical slits of the left and right vertical legs;
    left and right sliding members, made of an elongated flexible material having a predetermined compression strength, respectively disposed in the vertical conduits of the left and right vertical legs, the sliding members being coupled to the window pane for sliding the window pane vertically within the frame; and
    a drive means, coupled to the left and right sliding members, for moving the sliding members in unison through their respective vertical conduits to thereby move the window pane.

2. The window of claim 1 wherein the sliding members are slotted tapes, and the window further comprises left and right couplers having projecting fingers that are insertable into the slots of the tapes, the left and right couplers connecting the tapes to the window pane.

3. The window of claim 2 wherein the slotted tapes are composed of a low friction, semi-rigid organic plastic.

4. The window of claim 3 wherein the tapes are composed of a plastic selected from the group consisting of a polyamide and a polyurethane.

5. The window of claim 1 wherein each vertical leg is further provided with a vertical gasket chamber that is accessible through the vertical slit, the left and right edges of the window pane extend into the gasket chambers of the respective left and right vertical legs, and each vertical leg is further provided with a gasket means within its respective gasket chamber for sealing spaces between the left and right edges of the window pane and their respective left and right vertical legs.

6. The window of claim 5 further comprising spring means provided within the gasket chamber of each vertical leg for resiliently sealing the edges of the window pane.

7. The window of claim 1 further comprising a first resilient band which is coupled between a lower middle portion of the window pane and an upper left portion of the frame, and a second resilient band which is coupled between the middle bottom portion of the window pane and an upper right portion of the frame, the first and second resilient bands being arranged to counter the force of the weight of the window pane.

8. The window of claim 1 wherein the frame further comprises a base portion on which the left and right vertical legs are mounted, the drive means is disposed within the base portion, and the base portion includes left and right corner pieces, each having an arc-shaped conduit defined therethrough, for guiding the sliding members from a vertical orientation within the vertical legs to a substantially horizontal orientation within the base.

* * * * *